United States Patent [19]
Sutton

[11] Patent Number: 5,836,261
[45] Date of Patent: Nov. 17, 1998

[54] VEHICLE ANTENNA TOPPER

[76] Inventor: Dolores M. Sutton, 334 Laurentian Pl., Elmira, N.Y. 14904-2807

[21] Appl. No.: 907,644

[22] Filed: Aug. 11, 1997

Related U.S. Application Data

[60] Provisional application No. 60/025,010 Aug. 21, 1996.

[51] Int. Cl. [6] .................................................. G09F 17/00
[52] U.S. Cl. ........................................ 116/209; 116/28 R
[58] Field of Search .................................. 116/28 R, 209, 116/173; 40/591, 592

[56] References Cited

U.S. PATENT DOCUMENTS

| | | | |
|---|---|---|---|
| 2,329,046 | 9/1943 | Halbig | 116/28 R |
| 3,172,220 | 3/1965 | Christensen | 40/591 |
| 3,531,634 | 9/1970 | Plouch | 116/28 R |
| 3,768,434 | 10/1973 | Pinter | 116/28 R |
| 4,526,820 | 7/1985 | Haas . | |
| 4,624,211 | 11/1986 | Jokel . | |
| 4,881,485 | 11/1989 | Feinberg . | |
| 4,901,662 | 2/1990 | Sandeen et al. | 116/28 R |
| 4,964,360 | 10/1990 | Henry | 116/28 R |
| 4,972,795 | 11/1990 | Mace . | |
| 4,989,536 | 2/1991 | Liming et al. . | |
| 5,078,075 | 1/1992 | Liming et al. | 116/28 R |
| 5,176,099 | 1/1993 | Katz et al. . | |
| 5,572,225 | 11/1996 | McCarthy | 116/173 |

FOREIGN PATENT DOCUMENTS

| | | |
|---|---|---|
| 3537698 | 7/1986 | Germany . |
| 58-56941 | 4/1983 | Japan . |
| 2037467 | 7/1980 | United Kingdom . |

*Primary Examiner*—Diego F. F. Gutierrez
*Assistant Examiner*—Andrew Hirshfield
*Attorney, Agent, or Firm*—Richard C. Litman

[57] ABSTRACT

An antenna topper includes an ornamental element which is capable of being secured to the antenna of the vehicle. The ornamental element can be hollow or solid. Solid ornamental elements include a centrally disposed bore sized to frictionally engage the antenna. A hollow ornamental element includes a plurality of support members attached to the interior thereof to define an aperture. The support members are resiliently biased so that the ball at the end of the antenna may be forced through the aperture. The antenna topper can be in the form of sports balls, expressioning faces, animals, etc. The antenna topper can also be constructed of various lightweight materials such as plastic, rubber, styrofoam, etc.

3 Claims, 6 Drawing Sheets

VEHICLE ANTENNA TOPPER

CROSS-REFERENCE TO RELATED APPLICATION

This application claims the benefit of U.S. Provisional Patent application Ser. No. 60/025,010, filed Aug. 21, 1996.

BACKGROUND OF THE INVENTION

1. Field of the Invention

The present invention relates to an inexpensive vehicles antenna topper which can be readily retrofitted to stationary antennas for the purpose of identification of one's vehicle from afar.

2. Description of the Prior Art

It is common practice for motorists to park their vehicles in large parking facilities such as those located in shopping malls, entertainment stadiums, airports, etc. On such occasions, it is imperative that the motorist remember the location of the parked vehicle. On most occasions, however, the motorist is more concerned with remembering information pertaining to the event or task for which he or she has travelled. Consequently, very little attention is paid to the location where the vehicle is parked. This is especially true when the motorist has borrowed or leased the vehicle which he or she is driving.

There are also situations where a motorist quickly parks a vehicle, promptly forgets its location, and has no idea where it is upon returning to find the vehicle. A classic example occurs when returning from a business trip or vacation, wherein the motorist attempts to locate the vehicle in a large parking facility after a few days, a week, or even longer. The same confusion often occurs after sporting or entertainment events.

It is also important to be able to quickly and effectively identify a vehicle or vehicles which do not belong to the driver. For example, a motorist who borrows a vehicle from a friend or leases a vehicle from a commercial concern will often find it difficult to identify the vehicle in a large parking facility or an area where several similar models are parked.

Various ornamental markers and the like exist for identifying and distinguishing vehicles. For example, U.S. Pat. No. 4,526,820 issued on Jul. 2, 1985, to Haas describes a plastic ornamental marker for vehicle antennas consisting of a pair of engageable marker members having a common channel to surround the antenna. An adhesive is provided on the inner mating surfaces of the marker members to secure the marker on the antenna. Printed indicia or integrally formed indicia are provided for identification. Alignment structure for the marker is made up of dowel pins in one half and matching sockets in the other half. This marker cannot be removed and reattached to the antenna.

U.S. Pat. No. 4,624,211 issued on Nov. 25, 1986, to Jokel describes an attachment device for attaching a ribbon, flag or a metal cylinder to a vehicle antenna. Two threaded and channeled screws fit over the antenna stem and are connected by a sleeve which encloses the ball tip. The lower screw has a nut and a machine screw to secure it to the stem. The upper rod screw has a slot and another nut to secure a marker ribbon or the upper string of a flag. The lower string of the flag is looped around the antenna stem. A metal cylinder can be fitted with a brazed nut on its bottom surface to attach to the upper screw. This attachment device is all metal in construction and involves many parts, whereas the instant invention involves a single element and does not require fasteners.

U.S. Pat. No. 4,881,485 issued on Nov. 21, 1989, to Feinberg describes an ornamental vehicle identification device in the form of a disposable container such as a topless cigarette box or an opened soft drink can with streamers attached in the openings. The box and the can are attached to a suction cup by a shaft and hook, respectively. This ornamental device is placed on the roof of a vehicle. The object of this invention is to use discarded materials in order to lessen the loss by theft or the elements. The instant invention is durable and requires less preparation for mounting.

U.S. Pat. No. 4,972,795 issued on Nov. 27, 1990, to Mace describes a football helmet antenna marker device which can have a goal post attached on top of the helmet. The antenna is secured at the terminal end in the helmet or in the goal post by a plurality of opposed, axially aligned thumb screws. The helmet is filled with foam rubber. The instant invention requires no such fastening to the antenna.

U.S. Pat. No. 4,989,536 issued on Feb. 5, 1991, to Liming et al. describes a three-piece swiveling antenna clamp for displaying a banner from its looped cord. The cylindrical clamp has complementary halves configured to envelop the antenna with its ball tip, and the halves are held together by a plastic cap coextensive with the halves. An alternative clamp embodiment has an extra interlocking top cap seal. This clamp has three parts and is limited to holding a looped cord.

U.S. Pat. No. 5,176,099 issued on Jan. 5, 1993, to Katz et al. describes an antenna ball for identification of a vehicle. The ball has two interlocking hemispheres wherein one half has a peripheral lip and two hooks which mate with the lip and apertures of the other half. The innovation is based on attachment and removal for storage in the glove compartment. The ball can be made of a light, durable plastic, metal, wood or styrofoam. The ball can have a symbol, a number or an advertisement. In direct contradistinction thereto, the instant invention is one-piece and can still be attached to and detached from a vehicle antenna without the need for interlocking parts which deteriorate with use and age.

None of the above inventions and patents, taken either singly or in combination, is seen to describe the instant invention as claimed.

SUMMARY OF THE INVENTION

In accordance with the objects of the invention, a vehicle antenna topper is provided for use in conjunction with a fixed vehicle antenna. The antenna topper includes an ornamental element which is capable of being secured to the antenna of the vehicle. The ornamental element can be hollow or solid. Solid ornamental elements include a centrally disposed bore which is sized to frictionally engage the antenna. A hollow ornamental element includes a plurality of support members attached to the interior thereof. The support members define an aperture which corresponds to the cross-sectional diameter of the antenna. The support members are resiliently biased so that the ball at the end of the antenna may be forced through the aperture. Once the ball has cleared the support members, the resilient bias is sufficient to retain the ornamental element on the antenna.

The ornamental element can be in the form of sports balls, expressioning faces, animals, etc. The ornamental element can also be constructed of various lightweight materials such as plastic, rubber, styrofoam, etc.

Accordingly, it is a principal object of the invention to provide an economical but effective vehicle antenna topper.

It is another object of the invention to provide either a hollow or solid antenna topper capable of being retained on the antenna during normal driving.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
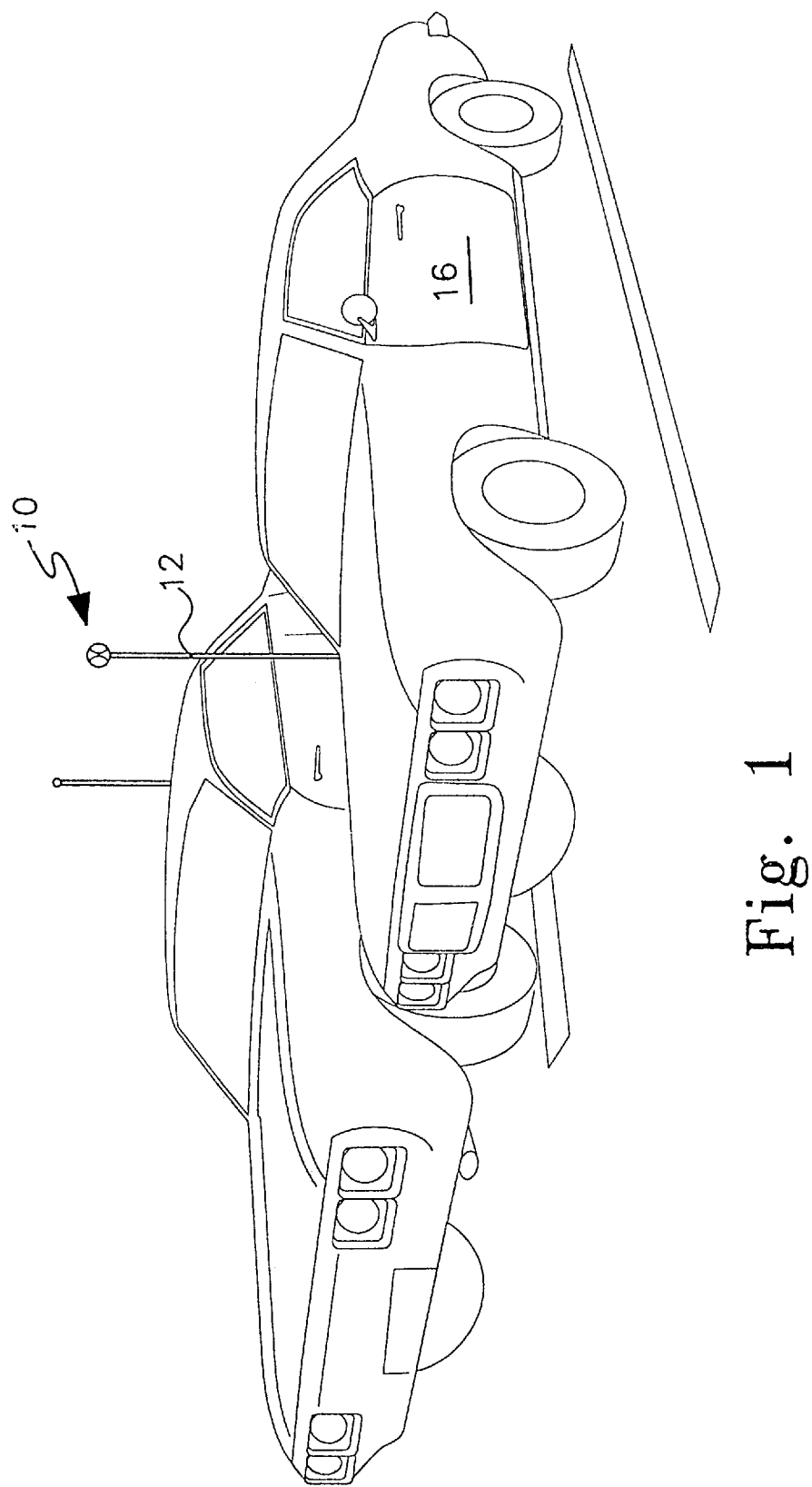
FIG. 1 is an environmental, perspective view of the present invention topping one of the vehicle antennas in a parking lot.
Figure 2:
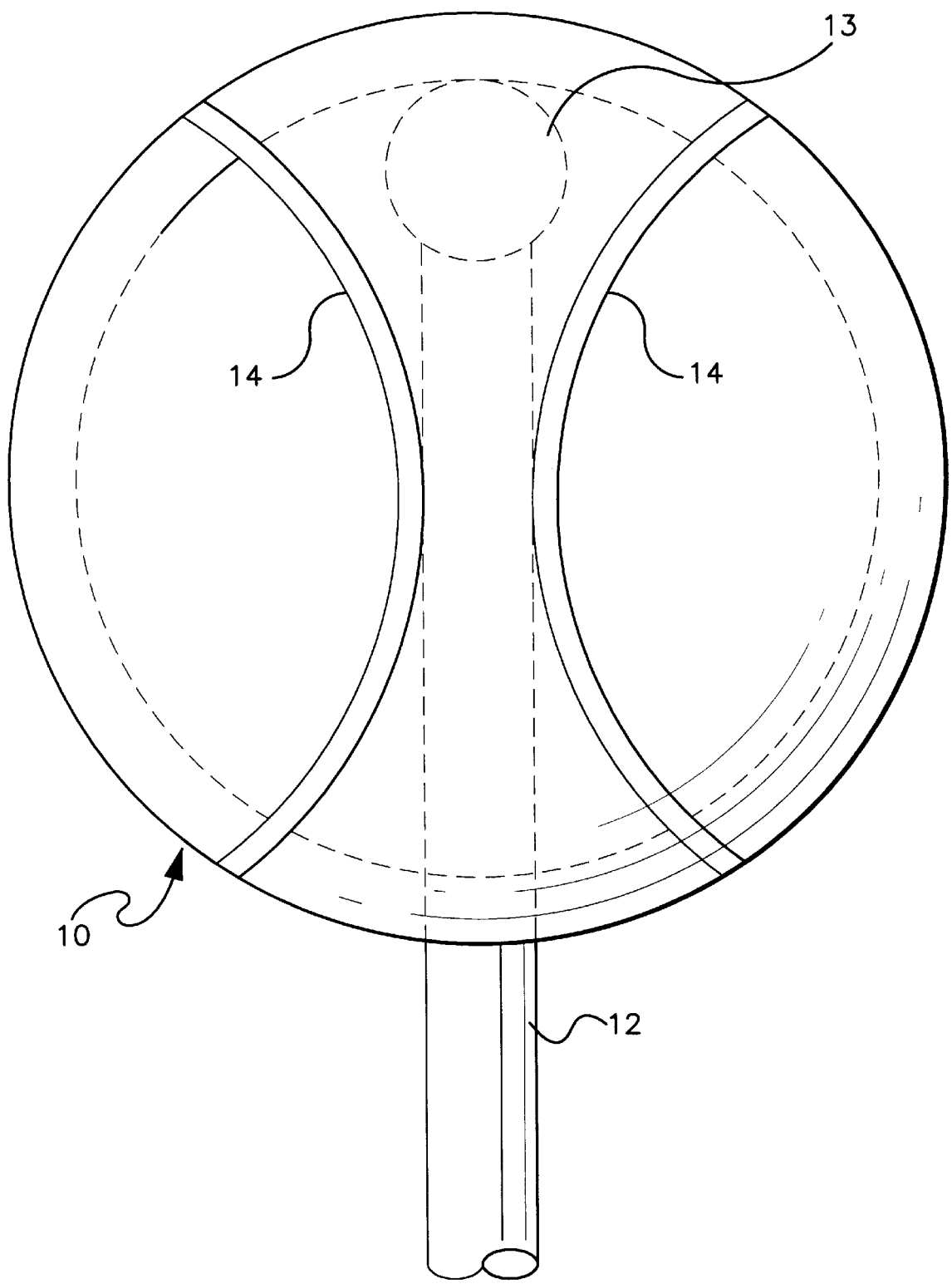
FIG. 2 is an enlarged scale, front elevational view of a hollow antenna topper.

Referring to FIGS. 1–2 of the drawings, a vehicle 16 which includes a fixed antenna 12 is shown in a parking facility. An antenna topper 10 in accordance with the present invention is also shown mounted on the antenna 12. As seen in FIG. 2, the antenna topper 10 is in the form of a baseball having a hollow interior. Furthermore, the antenna 12 includes a ball 13 attached at the end thereof. A plurality of support members 14 are secured to the interior portion of the antenna topper 10. The support members 14 are resiliently biased and define a restrictive passageway which is approximately the same size as the cross-sectional diameter of the antenna 12. The ball 13 however has a larger diameter than the antenna 12. Thus, a predetermined amount of force is required for the ball 13 to overcome the resilient bias of the support members 14 when the antenna topper 10 is placed upon the antenna 12. Once the ball 13 clears the passageway, the support members 14 are urged against the antenna 12 and function to retain the antenna topper 10 during driving activities.

As seen in FIGS. 1 and 2, the antenna topper 10 is in the form of a sports ball. The antenna topper 10 can also be constructed to resemble various specific sports balls or items, such as a volleyball, a tennis ball, a basketball, a ping pong ball, a soccer ball, a football, a golf ball, bowling ball, a bowling pin, etc., which any sports enthusiast would appreciate. On such occasions, each antenna topper 10 could be decorated with the colors associated with the specific sport, or team, for example.

Figure 3:
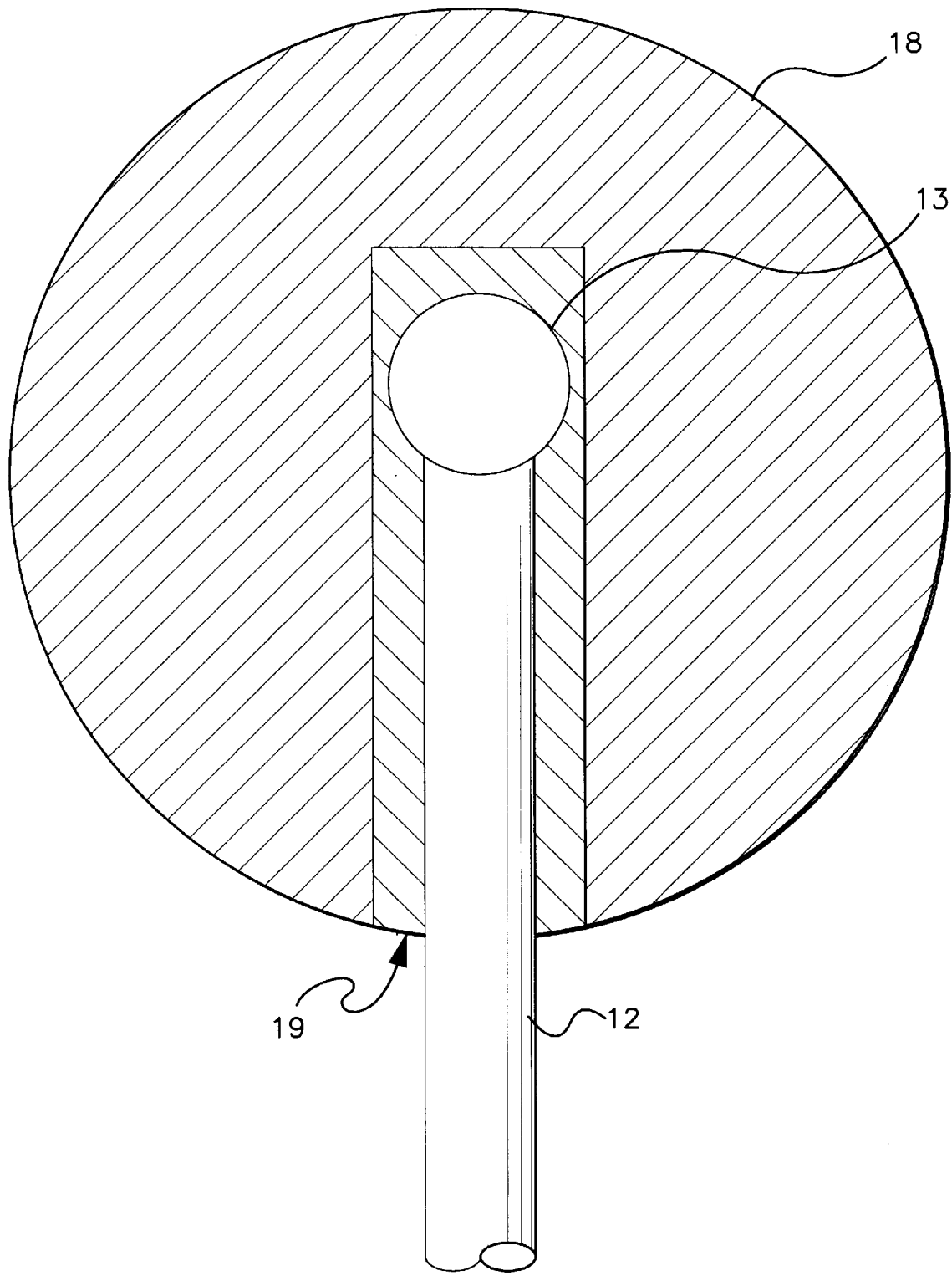
FIG. 3 is an enlarged scale, cross-sectional view of a topper in the form of a solid ball.

FIG. 3 illustrates the cross-section of an antenna topper 18 which is in the form of a solid ball. A bore extends into the antenna topper 18 to define a central cavity 19. The central cavity 19 is appropriately sized to frictionally contact the ball 13. Thus, a predetermined amount of force is necessary to properly position the antenna topper 18 on the antenna 12. Once positioned, the frictional force generated by the central cavity 19 is sufficient to retain the antenna topper 18 during driving activities. A layer of resilient material can also be disposed within the central cavity 19 in order to frictionally retain the ball 13 of the antenna 12. Finally, the antenna topper 18 can be constructed from rubber, plastic, styrofoam, etc.

The antenna topper 10 can also be decorated in various colors which further can be luminous, e.g.,luminescent, irradiative or phosphorescent. FIGS. 4–14 illustrated specific examples representative as to the genre, design and colors.

Figure 4:
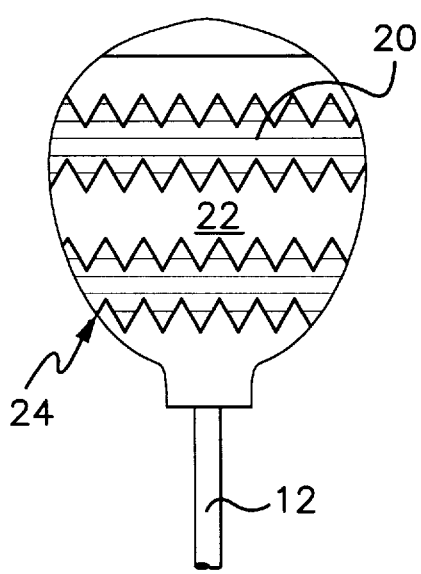
FIG. 4 is a front view of a topper in the form of a flight balloon with blue and white colors on an antenna.
Figure 5:
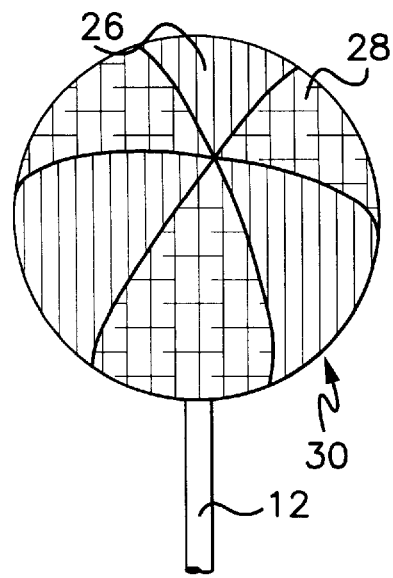
FIG. 5 is a front view of a topper in the form of a beach ball with red and yellow colors on an antenna.
Figure 6:
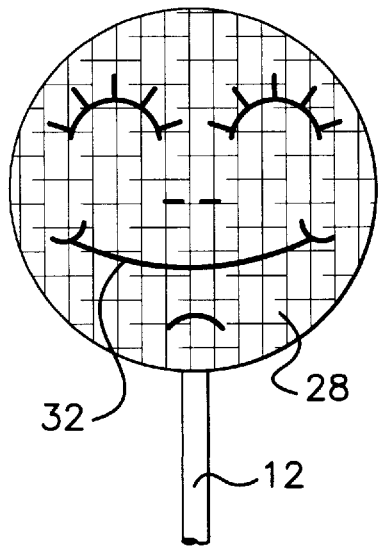
FIG. 6 is a front view of a topper in the form of a yellow smiling sun on an antenna.
Figure 7:
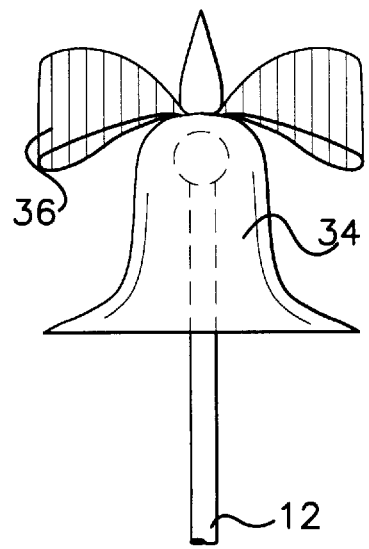
FIG. 7 is a side view of a topper in the form of a luminous bell with a red ribbon on an antenna.

FIG. 4 illustrates an antenna topper 24 which is in the form of a blue 20 and white 22 striped flight balloon on an antenna 12. This ornament can have other colors and designs as is known in the art. FIG. 5 illustrates an antenna topper 30 which is in the form of a red 26 and yellow 28 striped beach ball on an antenna 12. FIG. 6 illustrates an antenna topper 32 in the form of a smiling yellow 28 sun, while FIG. 7 illustrates an antenna topper in the form of a bell 34 with a red ribbon 36.

Figure 8:
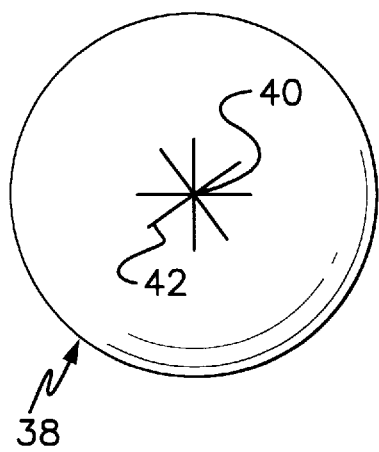
FIG. 8 is a bottom view of a topper in the form of a spherical decoration with an aperture and radiating slits for mounting.

FIG. 8 illustrates the bottom view of an antenna topper 38 in the form of a sphere. The antenna topper 38 includes attachment means in the form of an aperture 40 and radiating slits 42. This attachment means has been found to adequately hold the sphere on an antenna 12 during travel without recourse to any additional fastening means, by virtue of the pressing tension of the strips of the sphere. If the antenna 12 is inclined, it has been found that the aperture 40 and radiating slits 42 can be formed on both sides of a hollow sphere to permit the ball 13 at the end of the antenna 12 tip to protrude and retain the sphere 38. The aperture 40 and slits 42 shown in FIG. 8 may be included in the antenna topper 10 FIG, 2.

Figure 9:
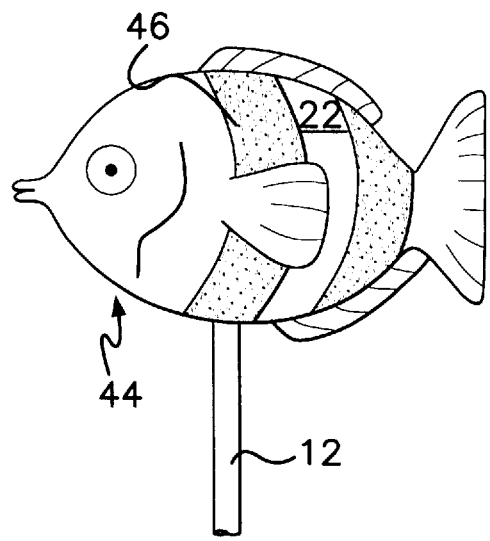
FIG. 9 is a side view of a topper in the form of a fish with black and white stripes.
Figure 10:
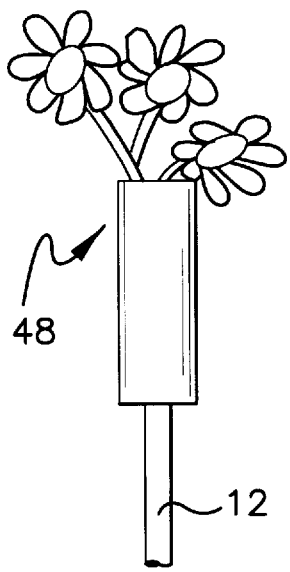
FIG. 10 is a front view of a topper in the form of a flower bouquet in a bud vase.
Figure 11:
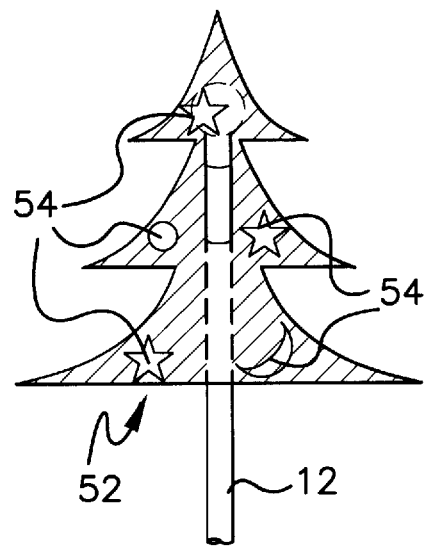
FIG. 11 is a side view of a topper in the form of an evergreen tree with Christmas decorations.

Turning to FIG. 9, an antenna topper 44 is shown in the form of a flat fish with black 46 and white 22 stripes. It should be noted that the shape, colors and design can be varied to duplicate a specific fish or an amphibian. FIG. 10 illustrates an antenna topper 48 in the form of a flower bouquet within a bud vase. This form is considered a solid sheath type which may not require any radial slits emanating from the aperture. FIG. 11 illustrates an antenna topper 52 in the form of an evergreen tree with Christmas ornaments 54. This form is amenable to fixation by opening a pair of parallel slits on each side and centered in order to pierce the antenna topper 52 with the antenna 12 as illustrated.

Figure 12:
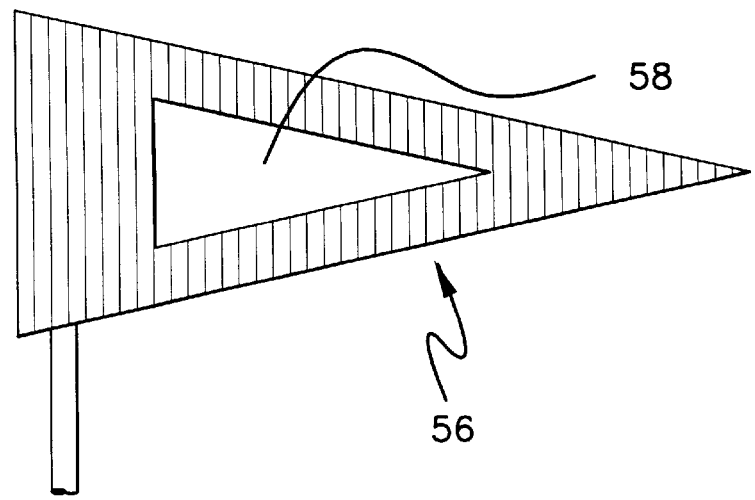
FIG. 12 is a side view of a topper in the form of a red pennant with an inner white triangle.
Figure 13:
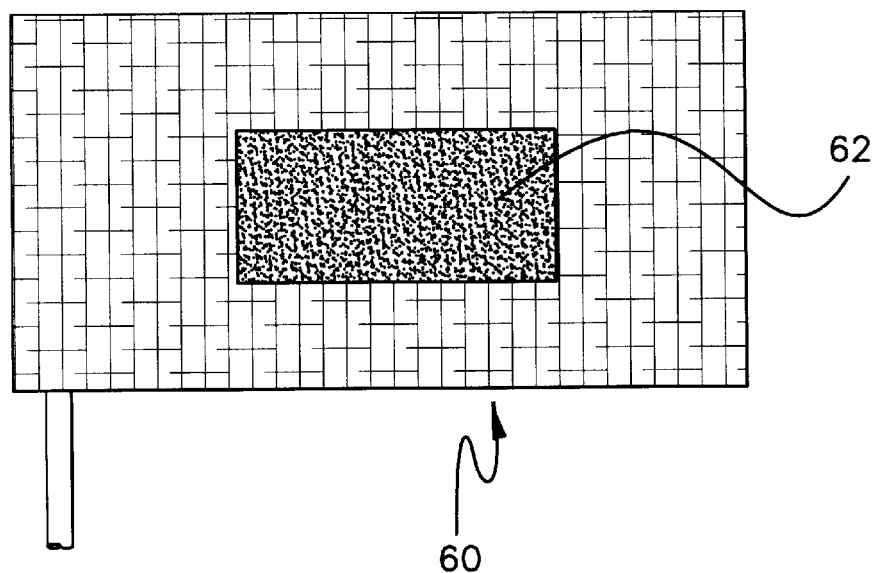
FIG. 13 is a side view of a topper in the form of yellow banner with a black rectangular center.
Figure 14:
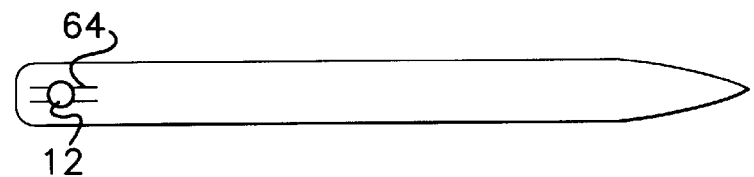
FIG. 14 is a bottom view of the FIG. 13 banner with an aperture and parallel slits for attachment.

FIG. 12 illustrates an antenna topper 56 in the form of a triangular red pennant with an enclosed white triangle 58. This embodiment can also employ as an alternative, the parallel slit feature of mounting as in FIG. 11. FIG. 13 illustrates an antenna topper 60 in the form of a yellow banner with a rectangular black center 62. FIG. 14 illustrates the underside of the antenna topper shown in FIG. 13. The antenna topper contains a bottom aperture and parallel slits 64 for attachment to an antenna 12. This type of opening has been found unexpectedly to firmly hold the banner during use.

The present invention provides for inexpensive, durable one-piece vehicle antenna toppers which can be added to conventional fixed vehicle antennas that are used for AM and FM radio reception. There is a need for such marking devices which are also attractive and selectively unique so as to enable the vehicle owner to readily locate the vehicle in a parking lot. The present invention includes various shapes and colors to decorate the antenna. The toppers can be associated with seasonal events, sports, animals, flowers, and celestial bodies.

As exemplary examples of the size of the toppers, a sports ball can be 2 inches in diameter, whereas the fish, pennant and banner can be slightly longer in length. The toppers can be molded with any flexible plastic in solid colors and/or painted with solid or luminous colors. The toppers can be hollow or solid as noted above. A suitable plastic for a solid topper would be styrofoam. The type of fixation means can vary from radial slits and parallel slits at the bottom or at both the bottom and top of the topper to medial parallel slits.

It is to be understood that the present invention is not limited to the embodiments described above, but encompasses any and all embodiments within the scope of the following claims.

I claim:

1. A vehicle antenna topper for engaging an end of a vehicle antenna terminating in a ball, the vehicle antenna topper comprising:

an ornamental element having a hollow interior and having an opening for retaining the antenna, said opening having a plurality of radiating slits extending therearound, and at least two opposing arcuate support members, each opposing arcuate support member having side surfaces located between opposite end surfaces, each end surface secured to said interior of said ornamental element, said at least two support members defining a passage aligned with said opening in said ornamental element, and said at least two arcuate support members being resiliently biased for engaging the antenna.

2. A vehicle antenna topper as recited in claim 1, wherein said ornamental element is in the form of a spherical sports ball with coordinating colors and marking indicia representative of a predetermined, specific sport.

3. A vehicle antenna topper as recited in claim 1 wherein said ornamental element includes coordinating colors and marking indicia selected from the group consisting of smiling faces, fish, pennants, banners, flowers, and christmas ornaments.

* * * * *